US012604346B2

(12) United States Patent
 Ali et al.

(10) Patent No.: US 12,604,346 B2
(45) Date of Patent: Apr. 14, 2026

(54) CONNECTION MANAGEMENT SOLUTION TO SUPPORT UNICAST AND GROUPCAST COMMUNICATION OVER SIDELINK FOR EV2X

(71) Applicant: Apple Inc., Cupertino, CA (US)

(72) Inventors: Ansab Ali, Hillsboro, OR (US);
 Kyeongin Jeong, Portland, OR (US);
 Sangeetha L. Bangolae, Houston, TX
 (US); Youn Hyoung Heo, Seoul (KR)

(73) Assignee: Apple Inc., Cupertino, CA (US)

( * ) Notice: Subject to any disclaimer, the term of this
 patent is extended or adjusted under 35
 U.S.C. 154(b) by 0 days.

(21) Appl. No.: 17/250,917

(22) PCT Filed: Sep. 26, 2019

(86) PCT No.: PCT/US2019/053309
 § 371 (c)(1),
 (2) Date: Mar. 26, 2021

(87) PCT Pub. No.: WO2020/069228
 PCT Pub. Date: Apr. 2, 2020

(65) Prior Publication Data
 US 2021/0400738 A1 Dec. 23, 2021

Related U.S. Application Data

(60) Provisional application No. 62/737,515, filed on Sep.
 27, 2018.

(51) Int. Cl.
 *H04W 76/10* (2018.01)
 *H04W 4/40* (2018.01)

(52) U.S. Cl.
 CPC ............. *H04W 76/10* (2018.02); *H04W 4/40*
 (2018.02)

(58) Field of Classification Search
 CPC ......... H04W 76/10; H04W 4/40; H04W 4/08;
 H04W 8/005; H04W 76/14; H04W 92/18
 See application file for complete search history.

(56) References Cited

U.S. PATENT DOCUMENTS

| | | | |
|---|---|---|---|
| 2021/0068120 A1* | 3/2021 | Jung ..................... | H04L 1/1812 |
| 2021/0212138 A1* | 7/2021 | Ali ......................... | H04W 4/06 |
| 2021/0297841 A1* | 9/2021 | Jung ................... | H04W 68/005 |
| 2021/0314805 A1* | 10/2021 | Sanda .................... | H04W 8/24 |
| 2021/0315032 A1* | 10/2021 | Hu .......................... | H04W 8/24 |

OTHER PUBLICATIONS

Qualcomm Incorporated, "Support for Unicast, Groupcast and
Broadcast", R1-1809446, 3GPP TSG RAN WG1, Aug. 2018.
Nokia et al., "Initial View on Support of Unicast, Groupcast and
Broadcast", R1-1809044, 3GPP TSG RAN WG1, Aug. 2018

(Continued)

*Primary Examiner* — Mandish K Randhawa
(74) *Attorney, Agent, or Firm* — Fay Kaplun & Marcin,
LLP

(57) ABSTRACT

An apparatus of a first user equipment (UE) comprises one
or more baseband processors to generate a message to
indicate to a second UE that the first UE intends to establish
a new radio (NR) sidelink connection for enhanced vehicle-
to-everything (eV2X) services, and to process a response
from the second UE regarding the message. The apparatus
can include a memory to store the message.

20 Claims, 5 Drawing Sheets

(56)             References Cited

OTHER PUBLICATIONS

Huawei et al., "UE Autonomous Sidelink Allocation for NR V2X", R1-1808939, 3GPP TSG RAN WG1, Aug. 2018.

Huawei et al., "Support of Unicast and Groupcast for EV2X", R2-1801903, 3GPP TSG RAN WG2, Feb. 2018.

ZTE, "Report of Email Discussion [101#73][LTE/V2X] Destination Address Enhancement", R2-1804506, 3GPP TSG RAN WG2, Apr. 2018.

Qualcomm Incorporated et al., "Unicast and multicast V2X communication support over PC5", SA WG2 Meeting #S2-127BIS, May 28-Jun. 1, 2018, S2-185211, 7 sheets.

Qualcomm Incorporated et al., "Unicast and multicast V2X communication support over PC5", SA WG2 Meeting #S2-127BIS, May 28-Jun. 1, 2018, S2-185841, 7 sheets.

Qualcomm Incorporated, "Unicast link establishment solution for eV2X", SA WG2 Meeting #128bis, Aug. 20-24, 2018, S2-188076, 5 sheets.

Qualcomm Incorporated, "Unicast link establishment solution for eV2X", SA WG2 Meeting #128bis, Aug. 20-24, 2018, S2-188564, 5 sheets.

* cited by examiner

| V | SrvID | SRC | DST | Oct 1 |
|---|-------|-----|-----|-------|
|   |       |     |     | Oct 2 |
|   |       |     |     | Oct 3 |
|   |       |     |     | Oct 4 |
|   |       |     |     | Oct 5 |
|   |       |     |     | Oct 6 |
|   |       |     |     | Oct 7 |

310

290

CONNECTION MANAGEMENT SOLUTION TO SUPPORT UNICAST AND GROUPCAST COMMUNICATION OVER SIDELINK FOR EV2X

CROSS-REFERENCE TO RELATED APPLICATIONS

The present application claims the benefit of U.S. Provisional Application No. 62/737,515 (AB5636-Z) filed Sep. 27, 2018. Said Application No. 62/737,515 is hereby incorporated herein by reference in its entirety.

BACKGROUND

As the use of Fifth Generation (5G) New Radio (NR) radio access technology (RAT) becomes prevalent and widespread and new use cases of advanced vehicle-to-vehicle communication are identified, mechanisms for NR based systems can be supported to meet the associated requirements for these use cases. To this end, solutions for one-to-one and one-to-many connection establishment and management over NR sidelink can be provided in order to allow unicast and groupcast communication for enhanced vehicle-to-everything (eV2X) communication.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 1:
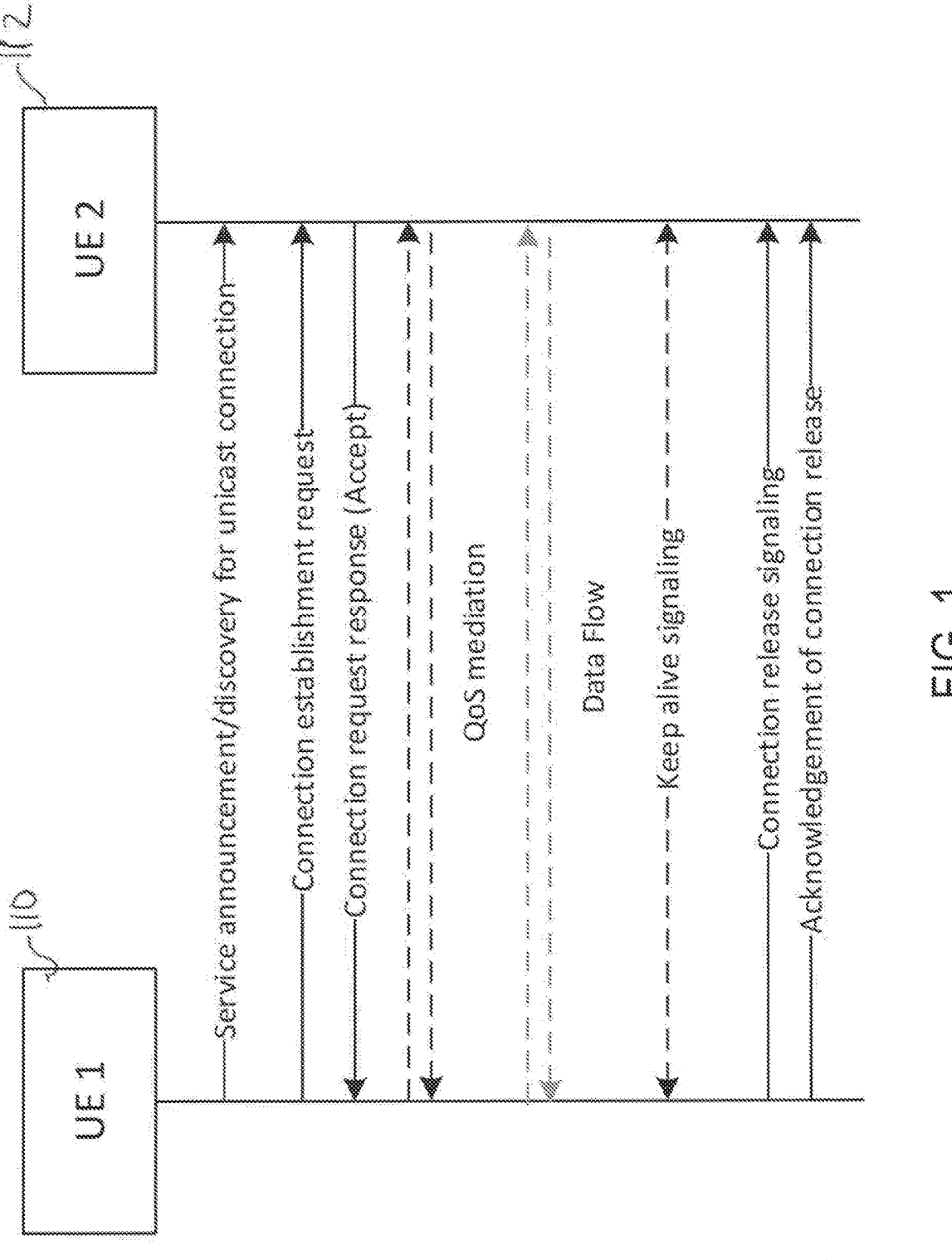
FIG. 1 is a diagram of generalized signaling flow for unicast connection management over sidelink in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. It will, however, be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. It should be noted, however, that "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Referring FIG. 1 is a diagram of generalized signaling flow for unicast connection management over sidelink in accordance with one or more embodiments. As the Third Generation Partnership Project (3GPP) vehicle-to-everything (V2X) standards evolve to incorporate advanced V2X use cases that go beyond road safety applications, there is a need to develop mechanisms that enable vehicular user equipment (UE) devices in communication range of each other to be able to effectively fulfill such use cases. While these use cases are functionally quite diverse, one aspect that seems common among them is the need for one-to-one and one-to-many communication between different UEs. For instance, for vehicular platooning, the basic idea is that a group of vehicles, either of the same or different type (e.g. semi-truck, passenger cars, etc.) are grouped together in a platoon such that they are able to move in a coordinated fashion, being aware of each other's status as well as their surroundings. This requires the platoon leader to be able to effectively communicate with individual Vehicular UEs (V-UEs) to manage the platoon.

The LTE based V2X design over sidelink inherently was based on broadcast, i.e. all packets sent by V-UEs over sidelink were sent blindly, i.e. with no particular receiver in mind. Specifically, the destination field identifier (ID) in the media access control (MAC) subheader, which usually indicates the destination ID for the intended V-UE, was simply mapped to the V2X service ID, e.g. PSID or ITS-AID for the V2X application running at the transmit UE. Therefore, there is no way or indeed no need, for the transmitting UE to know about the UE that received the packet. Additionally, there is no feedback mechanism in place at the receiving UE to inform the transmitting UE that it indeed received the packet. So, it is clear that there is a need to solve this issue in order to meet the unicast/groupcast requirement for advanced V2X use cases.

In this regard, the main aspect that needs to be supported over sidelink is establishing a direct connection between two or more UEs involved in V2X communication. This basically means that the UEs should be aware of each other's presence and set up a connection and exchange necessary information and related rules to agree upon a common means of communication. In the context of V2X communication, this includes, but is not limited to, the following messages:

Announcement of support for unicast/groupcast communication by a given UE (UE 1) for a given V2X service, followed by reception of message from interested UE (UE 2)

Connection establishment message for secure link establishment from UE 1

Response message from UE 2, either accepting or rejecting the request

Any subsequent message exchange for mediating rules for communication (including QoS and L2 destination IDs)

Data transfer for the related V2X service(s)

Keep alive, connection modification signaling and any other control signaling exchange Tear down message from either UE once the connection is no longer needed Acknowledgement of the connection release message The generalized signaling flow 100 corresponding to the messages listed above is shown in FIG. 1. The flow 100 shown in FIG. 1 is between a first UE (UE 1) 110 and a second UE (UE 2) 112. The messages of flow 100 can include, for example, a service announcement/discovery for unicast connection, a connection establishment request, a connection establishment response (accept), quality of service (QoS) mediation, data flow, keep alive signaling, connection release signaling, and acknowledgment of connection release.

One additional aspect to consider here is that new radio (NR) resource allocation for sidelink transmission is expected to follow the 3GPP Long Term Evolution (LTE) mechanism by providing two distinct modes: the network scheduled transmissions where the gNB schedules specific resources and the autonomous resources reservation and/or reselection mode where the UE selects resources based on sensing. So, the mode of operation for the UEs, i.e., network scheduled or autonomous resource selection, can potentially have an impact on the ability of the UE to form the unicast connection. We expect that one of the main reasons for doing so is to guarantee some QoS requirements not afforded by broadcast over sidelink. As a result, there can be the following two options, depending on network configuration.

In a first option, only UEs operating in network scheduled resource allocation mode can initiate unicast connection establishment (and this might not always be possible, depending on UE mode of operation). In this case, it is beneficial that the next generation NodeB (gNB) mediates the connection establishment between two UEs over sidelink. This also allows a better way to meet the QoS requirement for the particular V2X use case by using dedicated resources allocated by the gNB.

In a second option, UEs in either of the two modes can initiate connection establishment for unicast communication, i.e. agnostic to network coverage. While this option might seem more flexible, it is questionable whether autonomous resource selection mechanism can meet the stringent QoS requirements for advanced V2X applications, unless specific resources are allocated to avoid potential collisions.

For supporting such behavior in NR over sidelink, there are two main options that can be considered. The first one reuses the connection management feature and associated signaling from Proximity Services (ProSe) architecture which was developed in LTE Release 15 (Rel-15). The original intention of supporting the ProSe functionality was to enable establishment of the communication path directly between two or more ProSe-enabled Public Safety UEs, e.g., law enforcement, fire-fighting services, etc., even if they are outside of LTE network coverage. The second one relies on extending the radio resource control (RRC) connection management signaling to sidelink, which is traditionally applicable to uplink/downlink communication between the network and the UE. As discussed below, both options can be analyzed to provide technical solutions to support over sidelink for NR.

Figure 2:
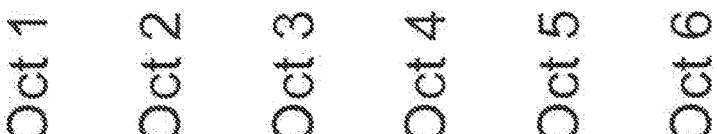
FIG. 2 is a diagram of a sidelink media access control (MAC) subheader design for Long Term Evolution (LTE) in accordance with one or more embodiments.

FIG. 2 is a diagram of a sidelink media access control (MAC) subheader design for Long Term Evolution (LTE) in accordance with one or more embodiments. In some examples, an extension of ProSe signaling can be provided. The crux of one-to-one direct communication for ProSe relies on the establishment of a secure link on layer-2 over sidelink. At its heart, this feature can be extended to NR sidelink for the sake of V2X communication. For this purpose, unique identifiers for the two UEs are required to identify the secure link without any ambiguity. The source and destination Layer-2 IDs are used for this purpose for ProSe and there are two options when considering NR V2X: either reusing the same L2 identifiers or to define new IDs for NR V2X. In one embodiment, the existing L2 IDs can be reused by extending them from LTE. This approach, however, has an added issue where there is no guarantee in ProSe that the source and destination L2 IDs are unique. This was addressed in LTE by defining an additional "V" field 210 in the MAC subheader 200 to differentiate between unicast and groupcast communication. So, to enable this behavior in NR V2X, assuming the overall header structure from LTE sidelink is reused, two features can be utilized as discussed below.

A first feature is shown in FIG. 2. The V field 210 as shown in FIG. 2 can have additional values indicating whether the destination field corresponds to the unicast identifier or the groupcast identifier for V2X communication, similar to LTE ProSe. Currently, this is only applicable in case of ProSe communication, so it is proposed to extend this to NR V2X communication as well. In this way, the UE can reuse the destination ID for unicast and groupcast communication. A second feature is shown in and described with respect to FIG. 2, below.

Figure 3:
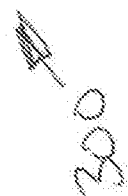
FIG. 3 is a diagram of a proposed sidelink media access control (MAC) subheader structure for New Radio (NR) V2X in accordance with one or more embodiments.

FIG. 3 is a diagram of a proposed sidelink media access control (MAC) subheader structure for New Radio (NR) V2X in accordance with one or more embodiments. The mapping rule of L2 destination ID to V2X service ID can be enhanced compared to LTE. Specifically, for LTE V2X, the Destination Layer-2 ID is simply set to the identifier provided by upper layers without any regard to whether it is to be used for unicast or broadcast. For NR V2X, however, this can be set to the corresponding ID for the destination UE once connection has been established. At the same time, since there is no restriction that the UE can only have a single V2X service involved in unicast communication, the V2X service ID also needs to be indicated in each packet.

In a first embodiment, a straightforward way of handling this is to include this information separately as part of the MAC subheader 300. Thus, each packet contains the source and destination ID as well as the V2X service ID such that the source and destination IDs are independent of V2X service ID. The MAC subheader will then look as in FIG. 3, where the SrvID field 310 can be reserved to indicate the V2X service identifier explicitly. Note that this can be implemented differently, for example by having a middle layer perform the mapping from V2X service ID to a different identifier for security purposes.

Alternatively, in a second embodiment, the mapping of Destination Layer-2 ID to V2X service can still be done by upper layer, as in LTE, and it can be left to the upper layer to additionally ensure that the source and destination IDs for the UE for each V2X service ID is unique. At time of connection establishment, the V2X service ID 310 can be included in the information shared between the two UEs and does not need to be included in each packet. Of course, this could imply multiple connection establishments by the UE, one for each interested V2X service, which has the drawback of additional complexity and seems less preferable.

The details of the connection establishment procedure as depicted in FIG. 1 are discussed below. Essentially, once a UE has identified the source L2 ID for the V-UE that is interested in setting up a unicast connection, a first UE (UE 1) 110 sends a connection establishment request directly to a second UE (UE 2) 112 to trigger the secure connection establishment procedure. The contents of this connection establishment request can be similar to ProSe, including but not limited to the following.

User info, which includes UE identifiers and the V2X application/service ID which triggers the connection establishment Maximum inactivity period for this connection Security related information, e.g. security key(s) and capabilities QoS related parameters, e.g. list of Pro-Se Per-Packet Priority (PPPP), ProSe Per-Packet Reliability (PPPR) and other values allowed to be sent over this connection Specific resources can be allocated by the network (NW) to UEs which are authorized to initiate unicast communication for this purpose optionally. Upon transmission of this message, a timer can be started at UE 1 to ensure that the UE is not stuck waiting for the response message from UE 2 and can subsequently retry or abort the connection request procedure. Upon reception of this message at UE 2, the UE can store the L2 IDs and associate them with this link. Additional procedures can be performed by UE 2, for example analyze the UE info included in the message, determine the security aspects can be considered by the UE and whether the QoS parameters/configuration indicated are acceptable. Based on this, UE 2 can then prepare the response to the original message. If successful, the UE 2 prepares and sends the connection establishment accept message to UE 1, using the appropriate identifiers as determined from the received message. Otherwise, a connection reject message can be sent, which includes the error cause value related to the reason why UE 2 did not accept the request. These values can be the same as the ones used for ProSe connection establishment. Once UE 1 receives the connection accept response message from UE 2, the connection is assumed to be established.

One modification to the above procedure can be an extra signaling step to be defined in case the QoS management/mediation needs to be done separately from the connection establishment step. It should be noted, however, that the two are closely intertwined. In fact, one of the main reasons why the UE has to set up a unicast connection for V2X communication is envisioned to be the need to meet specific QoS requirements not achievable by broadcast based communication. During the lifetime of such a connection, any data packets to be sent from UE 1 to UE 2, or vice versa, then follow the source and destination Layer-2 ID, and optionally the V2X service ID, and map the specific QoS rule for this connection.

There is support for keep alive signaling in ProSe as well to handle the case when no information is exchanged between the two UEs for some time. That can be extended to NR V2X case as well, whereby UE 1 can send a dedicated message to UE 2 indicating that the connection should be kept active. This can, for instance, be based on a timer implemented at the UE side. It is also possible that due to any reason, the source and/or the destination Layer-2 ID for either UE needs to be changed. Additionally, the QoS requirements for this link can change at any time. This information can also be included in the keep alive signaling. In this case, this keep alive message can include the updated user info which includes the new identifiers to be used for subsequent communications and/or the updated QoS related information for this link.

Once the connection needs to be torn down, either UE 1 or UE 2 can transmit the connection release message over sidelink. This can contain information on the specific cause for the trigger of this release message, for example if it is not needed any more or in case of change of provisioning/configuration at the UE which does not allow this connection to exist anymore. The other UE then can acknowledge the reception of this message and clear any related timers/counters related to this link. This ensures that both UEs are aware that the link has been successfully torn down.

In some embodiments, radio resource control (RRC) signaling can be utilized. The Radio Resource Configuration protocol is defined in LTE and NR and forms the backbone of all relevant signaling between the network and the UE. The individual services and functions served by the RRC layer protocol are numerous. At the most basic level, it serves for the establishment and maintenance of a dedicated RRC connection between the UE and the NW and management of associated RRC protocol states. Regarding V2X sidelink operation, the RRC layer is responsible for resource pool configuration for V-UEs, both inside and outside of network coverage. The ability of the UE to perform V2X communication over sidelink, however, is not directly impacted by its RRC, i.e., a UE in RRC_IDLE and RRC_CONNECTED state can perform V2X communication if it is configured and authorized with relevant resources to do so. Since the LTE V2X mechanism is inherently connectionless, to allow for connection-oriented communication, NR V2X mechanism can be enhanced.

Assuming the V-UEs are expected to perform unicast communication even when out of coverage, new RRC signaling can be defined to be sent over sidelink by UEs interested in setting up the unicast link. The contents of this message can be included in a new information element (IE) and can be similar to the contents of the connection establishment request message discussed in the prior section, i.e., the user info, security related parameters, QoS configuration, etc. needed for the establishment for a dedicated connection. This is exemplified in the simple IE structure below.

| SidelinkConnectionRequest message |
|---|

```
-- ASN1START
SidelinkConnectionRequest ::=          SEQUENCE {
SL-SourceIdentity ::=                  BIT STRING (SIZE (24))
SL-DestinationIdentity ::=             BIT STRING (SIZE (24))
V2X-ServiceIdentity ::=                BIT STRING (SIZE (4))
SecurityInfo ::=                       SL-SecurityInfo
QoS-Info ::=                           SL-QoS-Info
}
SL-QoS-Info ::=                        SEQUENCE {
priority    SL-Priority                            OPTIONAL,
reliability    SL-Reliability                      OPTIONAL,
```

-continued

---

SidelinkConnectionRequest message

---

```
}
SL-SecurityInfo::=              SEQUENCE {
}
-- ASN1STOP
```

---

The individual signaling flow for a RRC based solution to set up unicast connection over sidelink is not fundamentally different from the ProSe based solution; the main difference lies in the particular layer that is being utilized by the UE for this purpose. For ProSe, the connection management signaling will be carried directly over the PDCP layer and the advantage lies in utilizing existing signaling procedures, which a V2X UE with LTE sidelink support is expected to have, and adapting them for the case of NR V2X. For the case of RRC, the connection management signaling will be carried over an RRC layer across sidelink and new RRC signaling needs to be defined to serve the same purpose.

In some embodiments, support of Groupcast communication can be provided. In general, the solutions developed here are applicable for groupcast communication as well since groupcast can be considered as a special form of unicast in which the link is established between one transmitting UE and several receiving UEs. The relevant difference can be in the L2 identifiers, which can be associated to a group of UEs rather than a single UE and the UE info in the connection request message in this case refers to this destination L2 group ID rather than a single UE ID. This mediation of group identifiers is expected to be left up to the upper layers, as in the case of unicast, which simplifies access stratum (AS) layer operations.

Figure 4:
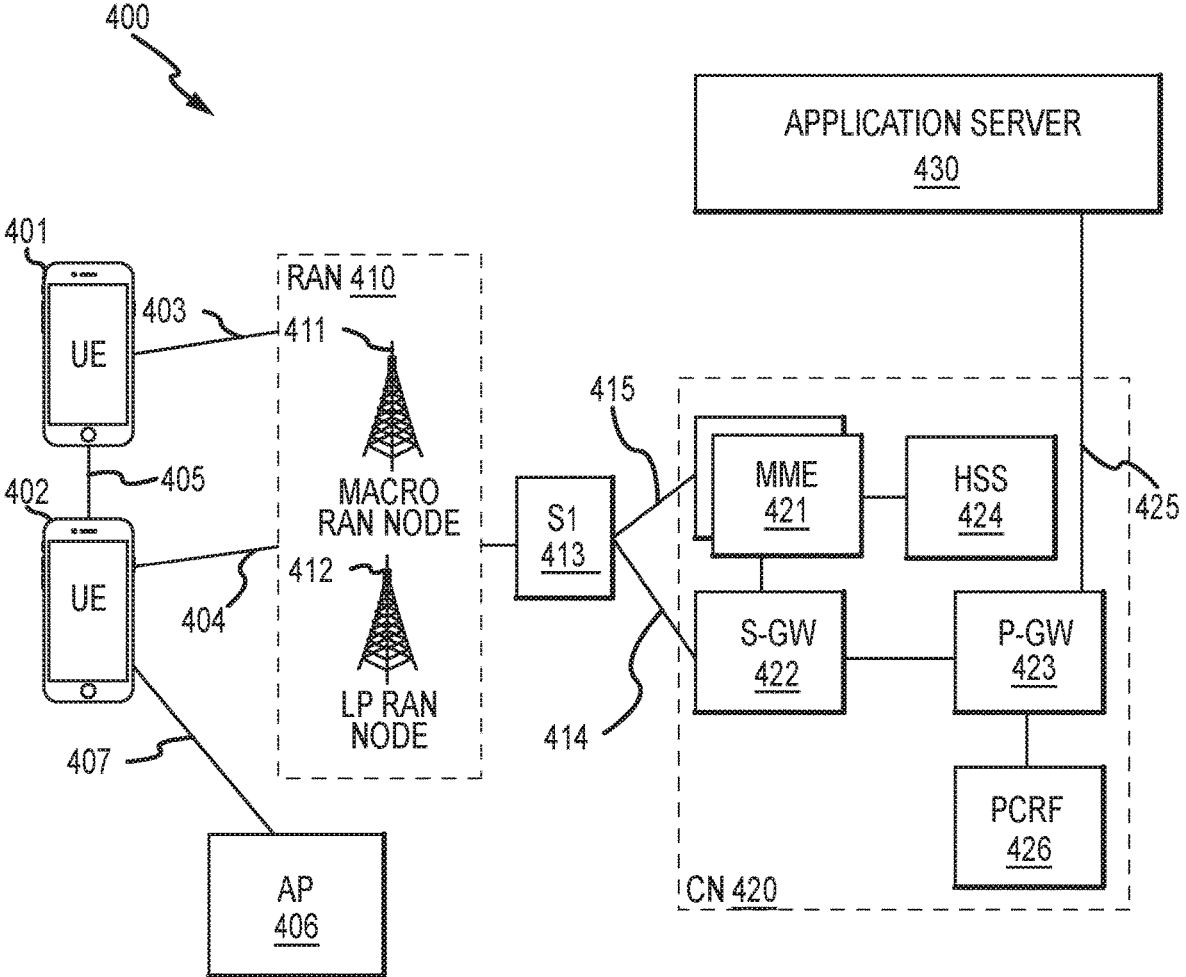
FIG. 4 illustrates an architecture of a system of a network in accordance with some embodiments.

FIG. 4 illustrates an architecture of a system 400 of a network in accordance with some embodiments. The system 400 is shown to include a user equipment (UE) 401 and a UE 402. The UEs 401 and 402 are illustrated as smartphones (e.g., handheld touchscreen mobile computing devices connectable to one or more cellular networks) but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 401 and 402 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSc) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 401 and 402 may be configured to connect, e.g., communicatively couple, with a radio access network (RAN) 410—the RAN 410 may be, for example, an Evolved Universal Mobile Telecommunications System (UMTS) Terrestrial Radio Access Network (E-UTRAN), a NextGen RAN (NG RAN), or some other type of RAN. The UEs 401 and 402 utilize connections 403 and 404, respectively, each of which comprises a physical communications interface or layer (discussed in further detail below); in this example, the connections 403 and 404 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT protocol, a ITT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 401 and 402 may further directly exchange communication data via a ProSe interface 405. The ProSe interface 405 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 402 is shown to be configured to access an access point (AP) 406 via connection 407. The connection 407 can comprise a local wireless connection, such as a connection consistent with any IEEE 802.11 protocol, wherein the AP 406 would comprise a wireless fidelity (WiFi®) router. In this example, the AP 406 is shown to be connected to the Internet without connecting to the core network of the wireless system (described in further detail below).

The RAN 410 can include one or more access nodes that enable the connections 403 and 404. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 410 may include one or more RAN nodes for providing macrocells, e.g., macro RAN node 411, and one or more RAN nodes for providing femtocells or picocells (e.g., cells having smaller coverage areas, smaller user capacity, or higher bandwidth compared to macrocells), e.g., low power (LP) RAN node 412.

Any of the RAN nodes 411 and 412 can terminate the air interface protocol and can be the first point of contact for the UEs 401 and 402. In some embodiments, any of the RAN nodes 411 and 412 can fulfill various logical functions for the RAN 410 including, but not limited to, radio network controller (RNC) functions such as radio bearer management, uplink and downlink dynamic radio resource management and data packet scheduling, and mobility management.

In accordance with some embodiments, the UEs 401 and 402 can be configured to communicate using Orthogonal Frequency-Division Multiplexing (OFDM) communication signals with each other or with any of the RAN nodes 411 and 412 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 411 and 412 to the UEs 401 and 402, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 401 and 402. The physical downlink control channel (PDCCH) may carry information about the transport format and resource allocations related to the PDSCH channel, among other things. It may also inform the UEs 401 and 402 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 411 and 412 based on channel quality information fed back from any of the UEs 401 and 402. The downlink resource assignment information may be sent on the PDCCH used for (e.g., assigned to) each of the UEs 401 and 402.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 410 is shown to be communicatively coupled to a core network (CN) 420—via an S1 interface 413. In embodiments, the CN 420 may be an evolved packet core (EPC) network, a NextGen Packet Core (NPC) network, or some other type of CN. In this embodiment the S1 interface 413 is split into two parts: the S1-U interface 414, which carries traffic data between the RAN nodes 411 and 412 and the serving gateway (S-GW) 422, and the S1-mobility management entity (MME) interface 415, which is a signaling interface between the RAN nodes 411 and 412 and MMEs 421.

In this embodiment, the CN 420 comprises the MMEs 421, the S-GW 422, the Packet Data Network (PDN) Gateway (P-GW) 423, and a home subscriber server (HSS) 424. The MMEs 421 may be similar in function to the control plane of legacy Serving General Packet Radio Service (GPRS) Support Nodes (SGSN). The MMEs 421 may manage mobility aspects in access such as gateway selection and tracking area list management. The HSS 424 may comprise a database for network users, including subscription-related information to support the network entities' handling of communication sessions. The CN 420 may comprise one or several HSSs 424, depending on the number of mobile subscribers, on the capacity of the equipment, on the organization of the network, etc. For example, the HSS 424 can provide support for routing/roaming, authentication, authorization, naming/addressing resolution, location dependencies, etc.

The S-GW 422 may terminate the S1 interface 413 towards the RAN 410, and routes data packets between the RAN 410 and the CN 420. In addition, the S-GW 422 may be a local mobility anchor point for inter-RAN node handovers and also may provide an anchor for inter-3GPP mobility. Other responsibilities may include lawful intercept, charging, and some policy enforcement.

The P-GW 423 may terminate an SGi interface toward a PDN. The P-GW 423 may route data packets between the EPC network 423 and external networks such as a network including the application server 430 (alternatively referred to as application function (AF)) via an Internet Protocol (IP) interface 425. Generally, the application server 430 may be an element offering applications that use IP bearer resources with the core network (e.g., UMTS Packet Services (PS) domain, LTE PS data services, etc.). In this embodiment, the P-GW 423 is shown to be communicatively coupled to an application server 430 via an IP communications interface 425. The application server 430 can also be configured to support one or more communication services (e.g., Voice-over-Internet Protocol (VoIP) sessions, PTT sessions, group communication sessions, social networking services, etc.) for the UEs 401 and 402 via the CN 420.

The P-GW 423 may further be a node for policy enforcement and charging data collection. Policy and Charging Enforcement Function (PCRF) 426 is the policy and charging control element of the CN 420. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 426 may be communicatively coupled to the application server 430 via the P-GW 423. The application server 430 may signal the PCRF 426 to indicate a new service flow and select the appropriate Quality of Service (QoS) and charging parameters. The PCRF 426 may provision this rule into a Policy and Charging Enforcement Function (PCEF) (not shown) with the appropriate traffic flow template (TFT) and QoS class of identifier (QCI), which commences the QoS and charging as specified by the application server 430.

Figure 5:
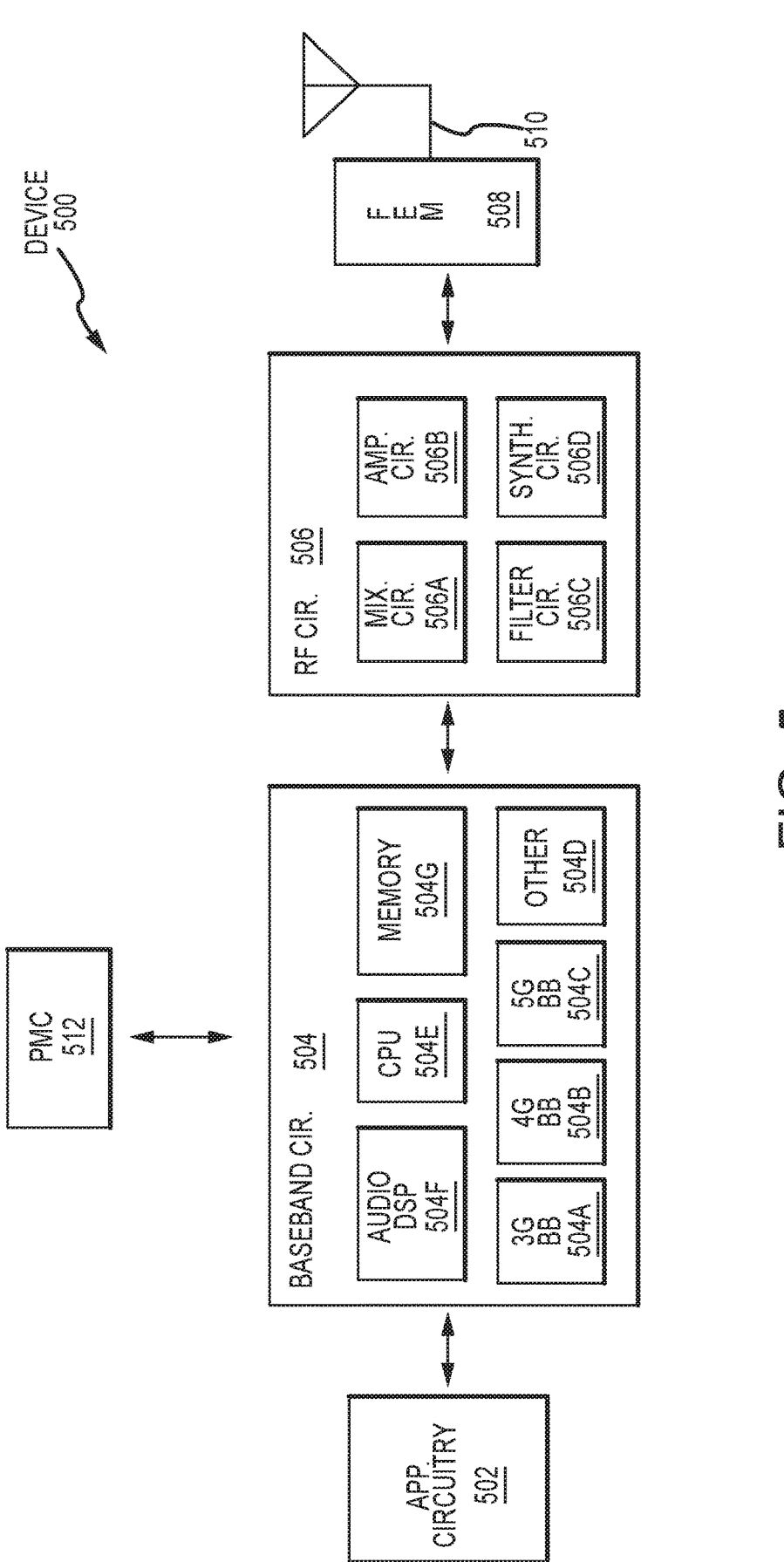
FIG. 5 illustrates example components of a device in accordance with some embodiments.

FIG. 5 illustrates example components of a device 500 in accordance with some embodiments. In some embodiments, the device 500 may include application circuitry 502, baseband circuitry 504, Radio Frequency (RF) circuitry 506, front-end module (FEM) circuitry 508, one or more antennas 510, and power management circuitry (PMC) 512 coupled together at least as shown. The components of the illustrated device 500 may be included in a UE or a RAN node. In some embodiments, the device 500 may include less elements (e.g., a RAN node may not utilize application circuitry 502, and instead include a processor/controller to process IP data received from an EPC). In some embodiments, the device 500 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 502 may include one or more application processors. For example, the application circuitry 502 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 500. In some embodiments, processors of application circuitry 502 may process IP data packets received from an EPC.

The baseband circuitry 504 may include circuitry such as, but not limited to, one or more single-core or multi-core processors. The baseband circuitry 504 may include one or more baseband processors or control logic to process baseband signals received from a receive signal path of the RF circuitry 506 and to generate baseband signals for a transmit signal path of the RF circuitry 506. Baseband processing circuitry 504 may interface with the application circuitry 502 for generation and processing of the baseband signals and for controlling operations of the RF circuitry 506. For example, in some embodiments, the baseband circuitry 504 may include a third generation (3G) baseband processor 504A, a fourth generation (4G) baseband processor 504B, a fifth generation (5G) baseband processor 504C, or other baseband processor(s) 504D for other existing generations, generations in development or to be developed in the future (e.g., second generation (2G), sixth generation (6G), etc.). The baseband circuitry 504 (e.g., one or more of baseband processors 504A-D) may handle various radio control functions that enable communication with one or more radio networks via the RF circuitry 506. In other embodiments, some or all of the functionality of baseband processors 504A-D may be included in modules stored in the memory 504G and executed via a Central Processing Unit (CPU) 504E. The radio control functions may include, but are not limited to, signal modulation/demodulation, encoding/decoding, radio frequency shifting, etc. In some embodiments, modulation/demodulation circuitry of the baseband circuitry 504 may include Fast-Fourier Transform (FFT), precoding, or constellation mapping/demapping functionality. In some embodiments, encoding/decoding circuitry of the baseband circuitry 504 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 504 may include one or more audio digital signal processor(s) (DSP) 504F. The audio DSP(s) 504F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 504 and the application circuitry 502 may be implemented together such as, for example, on a system on a chip (SOC).

In some embodiments, the baseband circuitry 504 may provide for communication compatible with one or more radio technologies. For example, in some embodiments, the baseband circuitry 504 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 504 is configured to support radio communications of more than one wireless protocol may be referred to as multi-mode baseband circuitry.

RF circuitry 506 may enable communication with wireless networks using modulated electromagnetic radiation through a non-solid medium. In various embodiments, the RF circuitry 506 may include switches, filters, amplifiers, etc. to facilitate the communication with the wireless network. RF circuitry 506 may include a receive signal path which may include circuitry to down-convert RF signals received from the FEM circuitry 508 and provide baseband signals to the baseband circuitry 504. RF circuitry 506 may also include a transmit signal path which may include circuitry to up-convert baseband signals provided by the baseband circuitry 504 and provide RF output signals to the FEM circuitry 508 for transmission.

In some embodiments, the receive signal path of the RF circuitry 506 may include mixer circuitry 506a, amplifier circuitry 506b and filter circuitry 506c. In some embodiments, the transmit signal path of the RF circuitry 506 may include filter circuitry 506c and mixer circuitry 506a. RF circuitry 506 may also include synthesizer circuitry 506d for synthesizing a frequency for use by the mixer circuitry 506a of the receive signal path and the transmit signal path. In some embodiments, the mixer circuitry 506a of the receive signal path may be configured to down-convert RF signals received from the FEM circuitry 508 based on the synthesized frequency provided by synthesizer circuitry 506d. The amplifier circuitry 506b may be configured to amplify the down-converted signals and the filter circuitry 506c may be a low-pass filter (LPF) or band-pass filter (BPF) configured to remove unwanted signals from the down-converted signals to generate output baseband signals. Output baseband signals may be provided to the baseband circuitry 504 for further processing. In some embodiments, the output baseband signals may be zero-frequency baseband signals, although this is not a requirement. In some embodiments, mixer circuitry 506a of the receive signal path may comprise passive mixers, although the scope of the embodiments is not limited in this respect.

In some embodiments, the mixer circuitry 506a of the transmit signal path may be configured to up-convert input baseband signals based on the synthesized frequency provided by the synthesizer circuitry 506d to generate RF output signals for the FEM circuitry 508. The baseband signals may be provided by the baseband circuitry 504 and may be filtered by filter circuitry 506c.

In some embodiments, the mixer circuitry 506a of the receive signal path and the mixer circuitry 506a of the transmit signal path may include two or more mixers and may be arranged for quadrature downconversion and upconversion, respectively. In some embodiments, the mixer circuitry 506a of the receive signal path and the mixer circuitry 506a of the transmit signal path may include two or more mixers and may be arranged for image rejection (e.g., Hartley image rejection). In some embodiments, the mixer circuitry 506a of the receive signal path and the mixer circuitry 506a may be arranged for direct downconversion and direct upconversion, respectively. In some embodiments, the mixer circuitry 506a of the receive signal path and the mixer circuitry 506a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 506 may include analog-to-digital converter (ADC) and digital-to-analog converter (DAC) circuitry and the baseband circuitry 504 may include a digital baseband interface to communicate with the RF circuitry 506.

In some dual-mode embodiments, a separate radio IC circuitry may be provided for processing signals for each spectrum, although the scope of the embodiments is not limited in this respect. In some embodiments, the synthesizer circuitry 506d may be a fractional-N synthesizer or a fractional N/N+1 synthesizer, although the scope of the embodiments is not limited in this respect as other types of frequency synthesizers may be suitable. For example, synthesizer circuitry 506d may be a delta-sigma synthesizer, a frequency multiplier, or a synthesizer comprising a phase-locked loop with a frequency divider.

The synthesizer circuitry 506d may be configured to synthesize an output frequency for use by the mixer circuitry 506a of the RF circuitry 506 based on a frequency input and a divider control input. In some embodiments, the synthesizer circuitry 506d may be a fractional N/N+1 synthesizer.

In some embodiments, frequency input may be provided by a voltage-controlled oscillator (VCO), although that is not a requirement. Divider control input may be provided by either the baseband circuitry 504 or the applications processor 502 depending on the desired output frequency. In some embodiments, a divider control input (e.g., N) may be determined from a look-up table based on a channel indicated by the applications processor 502.

Synthesizer circuitry 506d of the RF circuitry 506 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 506d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 506 may include an IQ/polar converter.

FEM circuitry 508 may include a receive signal path which may include circuitry configured to operate on RF signals received from one or more antennas 510, amplify the received signals and provide the amplified versions of the received signals to the RF circuitry 506 for further processing. FEM circuitry 508 may also include a transmit signal path which may include circuitry configured to amplify signals for transmission provided by the RF circuitry 506 for transmission by one or more of the one or more antennas 510. In various embodiments, the amplification through the transmit or receive signal paths may be done solely in the RF circuitry 506, solely in the FEM 508, or in both the RF circuitry 506 and the FEM 508.

In some embodiments, the FEM circuitry 508 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 506). The transmit signal path of the FEM circuitry 508 may include a power amplifier (PA) to amplify input RF signals (e.g., provided by RF circuitry 506), and one or more filters to generate RF signals for subsequent transmission (e.g., by one or more of the one or more antennas 510).

In some embodiments, the PMC 512 may manage power provided to the baseband circuitry 504. In particular, the PMC 512 may control power-source selection, voltage scaling, battery charging, or DC-to-DC conversion. The PMC 512 may often be included when the device 500 is capable of being powered by a battery, for example, when the device is included in a UE. The PMC 512 may increase the power conversion efficiency while providing desirable implementation size and heat dissipation characteristics.

While FIG. 5 shows the PMC 512 coupled only with the baseband circuitry 504. However, in other embodiments, the PMC 512 may be additionally or alternatively coupled with, and perform similar power management operations for, other components such as, but not limited to, application circuitry 502, RF circuitry 506, or FEM 508.

In some embodiments, the PMC 512 may control, or otherwise be part of, various power saving mechanisms of the device 500. For example, if the device 500 is in an RRC_Connected state, where it is still connected to the RAN node as it expects to receive traffic shortly, then it may enter a state known as Discontinuous Reception Mode (DRX) after a period of inactivity. During this state, the device 500 may power down for brief intervals of time and thus save power.

If there is no data traffic activity for an extended period of time, then the device 500 may transition off to an RRC_Idle state, where it disconnects from the network and does not perform operations such as channel quality feedback, handover, etc. The device 500 goes into a very low power state and it performs paging where again it periodically wakes up to listen to the network and then powers down again. The device 500 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 502 and processors of the baseband circuitry 504 may be used to execute elements of one or more instances of a protocol stack. For example, processors of the baseband circuitry 504, alone or in combination, may be used execute Layer 3, Layer 2, or Layer 1 functionality, while processors of the application circuitry 504 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

The following are example implementations of the subject matter described herein. In example one, an apparatus of a first user equipment (UE) comprises one or more baseband processors to generate a message to indicate to a second UE that the first UE intends to establish a new radio (NR) sidelink connection for enhanced vehicle-to-everything (eV2X) services, and to process a response from the second UE regarding the message, and a memory to store the message. In example two, the message is configured for a unicast communication mode. In example three, the message is configured for a groupcast communication mode. In example four, the message is configured for Proximity Services (ProSe) signaling over the NR sidelink. In example five, the message includes an identifier in an NR media access control (MAC) subheader to indicate unicast, groupcast, or broadcast communication. In example six, the message includes an identifier in an NR media access control (MAC) subheader to indicate a V2X service identifier (ID) for a relevant V2X packet. In example seven, an upper layer ensures that a source identifier (ID) and a destination ID for the first UE for each V2X service ID is defined uniquely. In example eight, the message is configured for radio resource control (RRC) signaling over the NR sidelink. In example nine, the message includes an RRC signaling information element (IE) for connection establishment over the NR sidelink. In example ten, the message is configured for groupcast communication to accommodate N number of additional UE receives separately for unicast connection management.

In example eleven, or more machine readable media have instructions stored thereon that, when executed by an apparatus of a first user equipment (UE) result in generating a message to indicate to a second UE that the first UE intends to establish a new radio (NR) sidelink connection for enhanced vehicle-to-everything (eV2X) services, and processing a response from the second UE regarding the message. In example twelve, the message is configured for a unicast communication mode. In example thirteen, the message is configured for a groupcast communication mode. In example fourteen, the message is configured for Proximity Services (ProSe) signaling over the NR sidelink. In example fifteen, the message includes an identifier in an NR media access control (MAC) subheader to indicate unicast, groupcast, or broadcast communication. In example sixteen, the message includes an identifier in an NR media access control (MAC) subheader to indicate a V2X service identifier (ID) for a relevant V2X packet. In example seventeen, an upper layer ensures that a source identifier (ID) and a destination ID for the first UE for each V2X service ID is defined uniquely. In example eighteen, the message is configured for radio resource control (RRC) signaling over the NR sidelink. In example nineteen, the message includes an RRC signaling information element (IE) for connection establishment over the NR sidelink. In example twenty, the message is configured for groupcast communication to accommodate N number of additional UE receives separately for unicast connection management.

Although the claimed subject matter has been described with a certain degree of particularity, it should be recognized that elements thereof may be altered by persons skilled in the art without departing from the spirit and/or scope of claimed subject matter. It is believed that the subject matter pertaining to a connection management solution to support unicast and groupcast communication over sidelink for eV2X and many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof; and/or further without providing substantial change thereto. It is the intention of the claims to encompass and/or include such changes.

What is claimed is:

1. A processor of a first user equipment (UE) configured to perform operations, the operations comprising:

transmitting a radio resource control (RRC) message to a second UE, the RRC message comprising an indication that the first UE intends to establish a new radio (NR) sidelink connection for a vehicle-to-everything (V2X) service, wherein the indication is an RRC information element (IE) comprising at least quality of service (QoS) related parameters for the NR sidelink connection, a source ID for the first UE, a destination ID for the second UE, a V2X service ID for the V2X service and security related information for the 5G NR sidelink comprising one or more security keys;

receiving a response to the RRC message from the second UE; and transmitting keep alive signaling (KAS) to the second UE, wherein the KAS comprises at least one of i) an updated QoS related parameter, ii) an updated source ID for the first UE, or iii) an updated destination ID for the second UE.

2. The processor of claim 1, wherein the NR sidelink connection is configured for a unicast communication mode.

3. The processor of claim 1, wherein the NR sidelink connection is configured for a groupcast communication mode.

4. The processor of claim 1, wherein the RRC message is configured for Proximity Services (ProSe) signaling over the NR sidelink.

5. The processor of claim 4, wherein the QoS related parameters include a list of ProSe per-packet priority (PPPP) and ProSe per-packet reliability (PPPR).

6. The processor of claim 5, wherein the source ID for the first UE is a first layer 2 ID and the destination ID for the second UE is a second layer 2 ID.

7. The processor of claim 6, wherein an upper layer ensures that a source ID for each V2X service ID is defined uniquely.

8. The processor of claim 1, wherein the response to the RRC message is a connection establishment accept message.

9. The processor of claim 1, wherein the KAS further comprises at least two of i) an updated QoS related parameter, ii) an updated source ID for the first UE, or iii) an updated destination ID for the second UE.

10. A first user equipment (UE), comprising:

a transceiver configured to communicate with a network; and a processor communicatively coupled to the transceiver and configured to perform operations, the operations comprising:

generating a radio resource control (RRC) message for a second UE comprising an indication that the first UE intends to establish a new radio (NR) sidelink connection for a vehicle-to-everything (V2X) service, wherein the indication is an RRC information element (IE) comprising at least quality of service (QoS) related parameters for the NR sidelink connection, a source ID for the first UE, a destination ID for the second UE, a V2X service ID for the V2X service and security related information for the 5G NR sidelink comprising one or more security keys;

processing a response to the RRC message from the second UE; and generating keep alive signaling (KAS) for the second UE, wherein the KAS comprises at least one of i) an updated QoS related parameter, ii) an updated source ID for the first UE, or iii) an updated destination ID for the second UE.

11. The first UE of claim 10, wherein the NR sidelink connection is configured for a unicast communication mode.

12. The first UE of claim 10, wherein the NR sidelink connection is configured for a groupcast communication mode.

13. The first UE of claim 10, wherein the RRC message is configured for Proximity Services (ProSe) signaling over the NR sidelink.

14. The first UE of claim 13, wherein the QoS related parameters include a list of ProSe per-packet priority (PPPP) and ProSe per-packet reliability (PPPR).

15. The first UE of claim 14, wherein the source identity for the first UE is a first layer 2 ID and the destination identity for the second UE is a second layer 2 ID.

16. The first UE of claim 15, wherein an upper layer ensures that a source ID for each V2X service ID is defined uniquely.

17. The first UE of claim 10, wherein the response to the RRC message is a connection establishment accept message.

18. The first UE of claim 10, wherein the KAS further comprises at least two of i) an updated QoS related parameter, ii) an updated source ID for the first UE, or iii) an updated destination ID for the second UE.

19. A method performed by a first user equipment (UE), comprising:

transmitting a radio resource control (RRC) message to a second UE, the RRC message comprising an indication that the first UE intends to establish a new radio (NR) sidelink connection for a vehicle-to-everything (V2X) service, wherein the indication is an RRC information element (IE) comprising at least quality of service (QOS) related parameters for the NR sidelink connection, a source ID for the first UE, a destination ID for the second UE, a V2X service ID for the V2X service and security related information for the 5G NR sidelink comprising one or more security keys;

receiving a response to the RRC message from the second UE; and transmitting keep alive signaling (KAS) to the second UE, wherein the KAS comprises at least one of i) an updated QoS related parameter, ii) an updated source ID for the first UE, or iii) an updated destination ID for the second UE.

20. The method of claim 19, wherein the NR sidelink connection is configured for a unicast communication mode or a groupcast communication mode.

\* \* \* \* \*